United States Patent
Park et al.

(10) Patent No.: US 11,652,589 B2
(45) Date of Patent: May 16, 2023

(54) TECHNIQUES FOR COHERENT JOINT TRANSMISSION FOR A MULTI-TRANSMIT AND RECEIVE POINT (TRP) WITH A DIFFERENT PHYSICAL CELL IDENTIFIER (PCID) BY USING A TYPE-II PORT SELECTION CODEBOOK

(71) Applicant: QUALCOMM Incorporated, San Diego, CA (US)

(72) Inventors: Sungwoo Park, Seoul (KR); Wooseok Nam, San Diego, CA (US); Kiran Venugopal, Raritan, NJ (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/326,100

(22) Filed: May 20, 2021

(65) Prior Publication Data

US 2021/0367728 A1 Nov. 25, 2021

Related U.S. Application Data

(60) Provisional application No. 63/029,186, filed on May 22, 2020.

(51) Int. Cl.
*H04L 5/00* (2006.01)
(52) U.S. Cl.
CPC .......... *H04L 5/0048* (2013.01); *H04L 5/0053* (2013.01)

(58) Field of Classification Search
CPC ........................... H04L 5/0048; H04L 5/0053
See application file for complete search history.

(56) References Cited

U.S. PATENT DOCUMENTS

| | | | | |
|---|---|---|---|---|
| 11,159,956 | B2* | 10/2021 | Zhou | H04L 5/005 |
| 2019/0230545 | A1* | 7/2019 | Liou | H04W 76/19 |
| 2020/0221405 | A1* | 7/2020 | Zarifi | H04W 52/50 |
| 2021/0167920 | A1* | 6/2021 | Cha | H04L 5/0048 |
| 2022/0190902 | A1* | 6/2022 | Zhang | H04W 56/001 |
| 2022/0312455 | A1* | 9/2022 | Zhu | H04B 7/024 |

* cited by examiner

*Primary Examiner* — Duc C Ho
(74) *Attorney, Agent, or Firm* — Arun Swain; ArentFox Schiff LLP

(57) ABSTRACT

This disclosure provides systems, methods and apparatus, including computer programs encoded on computer storage media, related to techniques for multiple transmission and reception point (TRP) transmission of channel state information reference signal (CSI-RS) resources. In one aspect, a user equipment (UE) can receive a CSI-RS resource including a first CSI-RS port on a first beam from a first cell of a network entity, the CSI-RS resource including a second CSI-RS port of the second cell on a second beam from a second cell of the network entity. In another aspect, a network entity can transmit, on a first beam from a first cell to a UE, a CSI-RS resource including a first CSI-RS port of the first cell, and transmit, on a second beam from a second cell to the UE, the CSI-RS resource including a second CSI-RS port of the second cell.

30 Claims, 10 Drawing Sheets

TECHNIQUES FOR COHERENT JOINT TRANSMISSION FOR A MULTI-TRANSMIT AND RECEIVE POINT (TRP) WITH A DIFFERENT PHYSICAL CELL IDENTIFIER (PCID) BY USING A TYPE-II PORT SELECTION CODEBOOK

CROSS-REFERENCE TO RELATED APPLICATION(S)

This application claims the benefit of U.S. Provisional Patent Application No. 63/029,186, entitled "TECHNIQUES FOR COHERENT JOINT TRANSMISSION FOR A MULTI-TRANSMIT AND RECEIVE POINT (TRP) WITH A DIFFERENT PHYSICAL CELL IDENTIFIER (PCID) BY USING A TYPE-II PORT SELECTION CODEBOOK" and filed on May 22, 2020, which is expressly incorporated by reference herein in its entirety.

TECHNICAL FIELD

Aspects of the present disclosure relate generally to wireless communication systems, and more particularly, to coherent joint transmission for a multi-transmit and receive point (TRP) having a different physical cell identifier (PCID) by using a Type-II port selection codebook.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method can include receiving, on a first beam from a first cell of a network entity, a channel state information reference signal (CSI-RS) resource including a first CSI-RS port of the first cell, receiving, on a second beam from a second cell of the network entity, the CSI-RS resource including a second CSI-RS port of the second cell, and transmitting, to the first cell or the second cell of the network entity, a CSI report in response to receiving the CSI-RS resource from the first cell and the second cell.

In some implementations, the first beam may be associated with the first CSI-RS port of the first cell and the second beam may be associated with the second CSI-RS port of the second cell.

In some implementations, the first CSI-RS port of the CSI-RS resource may be quasi co-located with a first SSB or a third CSI-RS resource of the first cell, and the second CSI-RS port of the CSI-RS resource may be quasi co-located with a second SSB or a fourth CSI-RS resource of the second cell.

In some implementations, the CSI-RS resource may be associated with multiple transmission configuration indicator (TCI) state identifiers of the first cell and the second cell, each of the multiple TCI state identifiers indicating a distinct quasi co-location source.

In some implementations, the CSI report may include at least one of an amplitude or phase of the first beam and the second beam.

In some implementations, the method may further include receiving a physical downlink shared channel (PDSCH) transmission on the first beam from the first cell and the second beam from the second cell in response to transmitting the CSI report, the first beam may be associated with a first demodulation reference signal (DMRS) port and the second beam may be associated with a second DMRS port.

In some implementations, the first DMRS port and the second DMRS port may be quasi co-located with the first CSI-RS port and the second CSI-RS port in the CSI resource.

In some implementations, the method may further include receiving a first set of SSBs from the first cell of the network entity, and a second set of SSBs from the second cell of the network entity.

In some implementations, the method may further include selecting a first SSB having a highest signal quality corresponding to the first beam from the first set of SSBs and a second SSB having a highest signal quality corresponding to the second beam from the second set of SSBs based on an SSB measurement, the first SSB and the second SSB are quasi co-located.

In some implementations, the method may further include transmitting, to the network entity, a first SSB index including the first SSB of the first cell and a second SSB index including the second SSB of the second cell.

Another innovative aspect of the subject matter described in this disclosure can be implemented in a method of wireless communication at an apparatus of a network entity. The method may include transmitting, on a first beam from a first cell to a UE, a CSI-RS resource including a first CSI-RS port of the first cell, transmitting, on a second beam from a second cell to the UE, the CSI-RS resource including a second CSI-RS port of the second cell, and receiving, at the first cell or the second cell, a CSI report in response to transmitting the CSI-RS resource from the first cell and the second cell.

In some implementations, the first beam may be associated with the first CSI-RS port of the first cell and the second beam may be associated with the second CSI-RS port of the second cell.

In some implementations, the first CSI-RS port of the CSI-RS resource may be quasi co-located with a first SSB or a third CSI-RS resource of the first cell, and the second CSI-RS port of the CSI-RS resource may be quasi co-located with a second SSB or a fourth CSI-RS resource of the second cell.

In some implementations, the CSI-RS resource is associated with multiple TCI state identifiers of the first cell and the second cell, each of the multiple TCI state identifiers indicating a distinct quasi co-location source.

In some implementations, the CSI report includes at least one of an amplitude or phase of the first beam and the second beam.

In some implementations, the method may further include transmitting a PDSCH transmission on the first beam from the first cell and the second beam from the second cell in response to transmitting the CSI report, where the first beam is associated with a first DMRS port and the second beam is associated with a second DMRS port.

In some implementations, the method may further include transmitting, to the UE, a first set of SSBs including a first SSB from the first cell, and a second set of SSBs including a second SSB from the second cell, where the first SSB and the second SSB are quasi co-located.

In some implementations, the method may further include receiving, from the UE, a first SSB index including the first SSB of the first cell and a second SSB index including the second SSB of the second cell.

In some implementations, the first DMRS port and the second DMRS port may be quasi co-located with the first CSI-RS port and the second CSI-RS port in the CSI resource.

A further innovative aspect of the subject matter described in this disclosure can be implemented at an apparatus of a UE for wireless communications including a memory and at least one processor coupled to the memory. The at least one processor may be configured to receive, on a first beam from a first cell of a network entity, a CSI-RS resource including a first CSI-RS port of the first cell, receive, on a second beam from a second cell of the network entity, the CSI-RS resource including a second CSI-RS port of the second cell, and transmit, to the first cell or the second cell of the network entity, a CSI report in response to receiving the CSI-RS resource from the first cell and the second cell.

Another innovative aspect of the subject matter described in this disclosure can be implemented at an apparatus of a network entity for wireless communications including a memory and at least one processor coupled to the memory. The at least one processor may be configured to transmit, on a first beam from a first cell to a UE, a CSI-RS resource including a first CSI-RS port of the first cell, transmit, on a second beam from a second cell to the UE, the CSI-RS resource including a second CSI-RS port of the second cell, and receive, at the first cell or the second cell, a CSI report in response to transmitting the CSI-RS resource from the first cell and the second cell.

An additional innovative aspect of the subject matter described in this disclosure can be implemented at an apparatus of a UE for wireless communications including means for receiving, on a first beam from a first cell of a network entity, a CSI-RS resource including a first CSI-RS port of the first cell, means for receiving, on a second beam from a second cell of the network entity, the CSI-RS resource including a second CSI-RS port of the second cell, and means for transmitting, to the first cell or the second cell of the network entity, a CSI report in response to receiving the CSI-RS resource from the first cell and the second cell.

In yet another innovative aspect of the subject matter described in this disclosure can be implemented at an apparatus of a network entity for wireless communications including means for means for transmitting, on a first beam from a first cell to a UE, a CSI-RS resource including a first CSI-RS port of the first cell, means for transmitting, on a second beam from a second cell to the UE, the CSI-RS resource including a second CSI-RS port of the second cell, and means for receiving, at the first cell or the second cell, a CSI report in response to transmitting the CSI-RS resource from the first cell and the second cell.

A further innovative aspect of the subject matter described in this disclosure can be implemented at a computer-readable medium storing computer executable code, the code when executed by a processor cause the processor to receive, on a first beam from a first cell of a network entity, a CSI-RS resource including a first CSI-RS port of the first cell, receive, on a second beam from a second cell of the network entity, the CSI-RS resource including a second CSI-RS port of the second cell, and transmit, to the first cell or the second cell of the network entity, a CSI report in response to receiving the CSI-RS resource from the first cell and the second cell.

A further innovative aspect of the subject matter described in this disclosure can be implemented at a computer-readable medium storing computer executable code, the code when executed by a processor cause the processor to transmit, on a first beam from a first cell to a UE, a CSI-RS resource including a first CSI-RS port of the first cell, transmit, on a second beam from a second cell to the UE, the CSI-RS resource including a second CSI-RS port of the second cell, and receive, at the first cell or the second cell, a CSI report in response to transmitting the CSI-RS resource from the first cell and the second cell.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
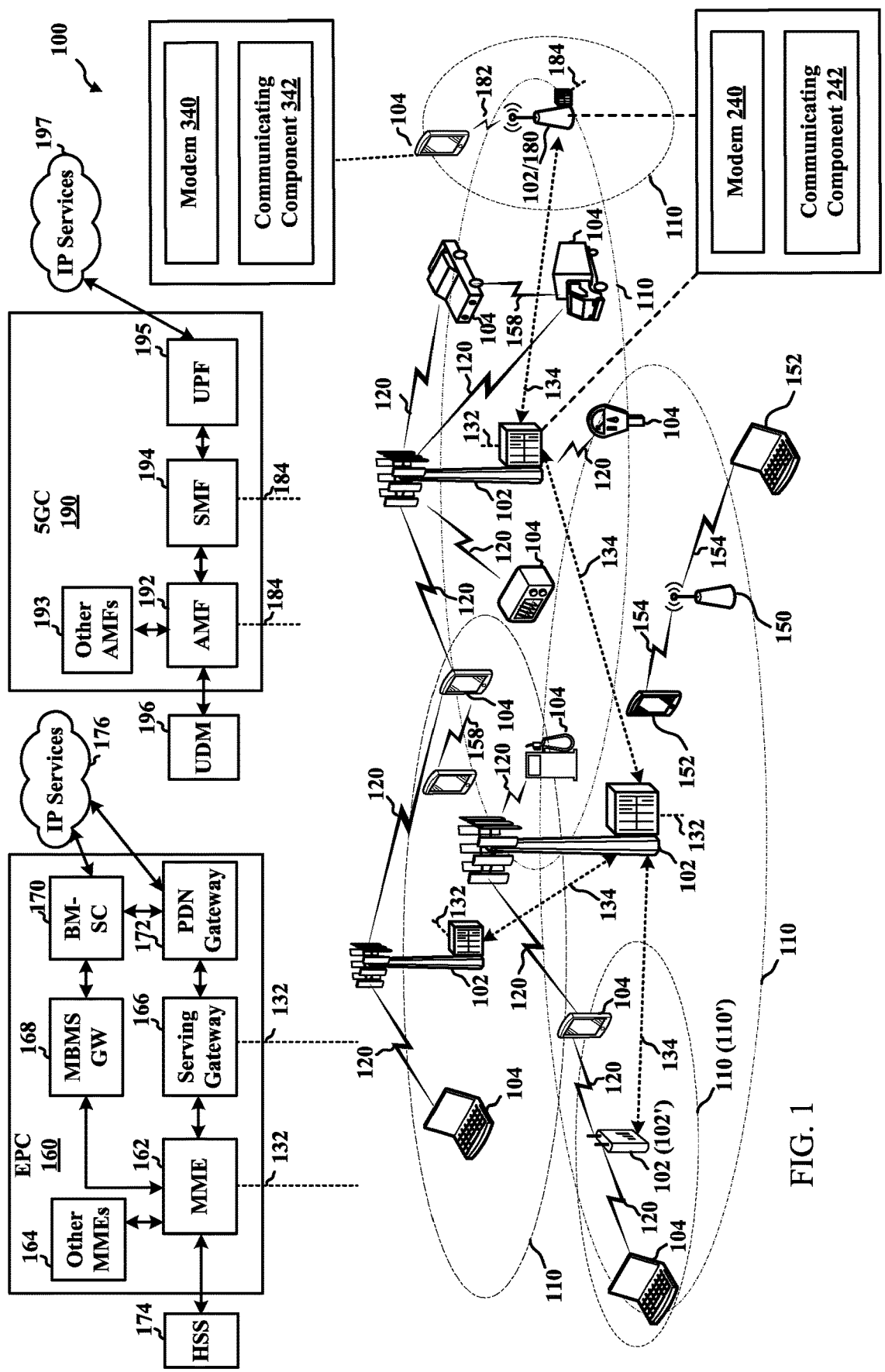
FIG. 1 illustrates an example of a wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The described features generally relate to coherent joint transmission for a multi-transmit and receive point (TRP) having a different physical cell identifier (PCID) by using a Type-II port selection codebook. Specifically, a network entity (such as a base station (BS)) may include multiple TRPs or cells that may simultaneously or concurrently transmit a similar signal (or data) over the same frequency channel. In some implementations, the network entity may transmit a number of synchronization signal block (SSBs) as part of establishing a connection with a user equipment (UE). For example, an SSB may correspond to a synchronization signal and a physical broadcast channel (PBCH). The synchronization signal may be a primary synchronization signal (PSS) or a secondary synchronization signal (SSS). In operation, a network entity may broadcast multiple SSBs via a beam sweeping procedure, such that one SSB may be associated with one beam, etc. Upon receiving the multiple SSBs, the UE may identify an SSB having a signal quality greater than the other SSBs (i.e., the signal quality of the identified SSB may be stronger or less attenuated than the other SSBs). That is, the UE may select a "best" SSB among the multiple SSBs based on SSB measurements. The UE may then indicate to the network entity the best beam index associated with a best transmit beam. In some scenarios, the network entity, which may be a single-TRP cell, may configure and transmit a channel state information reference signal (CSI-RS) resource having a single transmission configuration indication (TCI) state identifier to the UE. That is, in a single cell scenario, many up to all CSI-RS ports, if there are more than one, of the CSI-RS resource may be quasi co-located (QCLed) with a single SSB. However, in a multi-TRP scenario, quasi co-location (QCL) of the CSI-RS resource with appropriate CSI-RS ports may be desirable to ensure coherent joint transmissions from each cell or TRP.

Specifically, to provide for coherent joint transmission from multi-TRPs, a Type II port selection codebook may be implemented. In one aspect, the present disclosure provides techniques for a network entity to configure and transmit a CSI-RS resource including multiple CSI-RS ports each associated with a distinct cell or TRP. A UE may receive the CSI-RS resource from the multi-TRPs on different CSI-RS ports. The CSI-RS resource may have multiple QCL properties associated with the CSI-RS ports such that the CSI-RS resource has multiple TCI state identifiers.

Particular implementations of the subject matter described in this disclosure can be implemented to realize one or more of the following potential advantages. Implementing a Type II port selection codebook for multi-TRP communication may provide CSI-RS resources for a coherent joint transmission that have multiple QCL properties associated with multiple CSI ports (i.e., associated with SSBs of different cells). The coherent joint transmission may outperform a non-coherent joint transmission scheme for the multi-TRPs when a backhaul delay is negligible. Further, as opposed to some schemes in which each cell may configure a CSI-RS resource (i.e., one CSI-RS resource for one cell), the present disclosure may configure a single CSI-RS resource for two cells. Consequently, the UE may improve decoding performance of a downlink channel (i.e., PDSCH).

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc., or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include or otherwise correspond to gNBs 180. Further, the base stations 102 may each include multiple TRPs.

In one example, some nodes such as base station (BS) 102/gNB 180, may have a modem 240 and communicating component 242 for transmitting, on a first beam from a first cell to a UE, a CSI-RS resource including a first CSI-RS port of the first cell, transmitting, on a second beam from a second cell to the UE, the CSI-RS resource including a second CSI-RS port of the second cell, and receiving, at the first cell or the second cell, a CSI report in response to transmitting the CSI-RS resource from the first cell and the second cell, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for receiving, on a first beam from a first cell of a network entity, a CSI-RS resource including a first CSI-RS port of the first cell, receiving, on a second beam from a second cell of the network entity, the CSI-RS resource including a second CSI-RS port of the second cell, and transmitting, to the first cell or the second cell of the network entity, a CSI report in response to receiving the CSI-RS resource from the first cell and the second cell, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
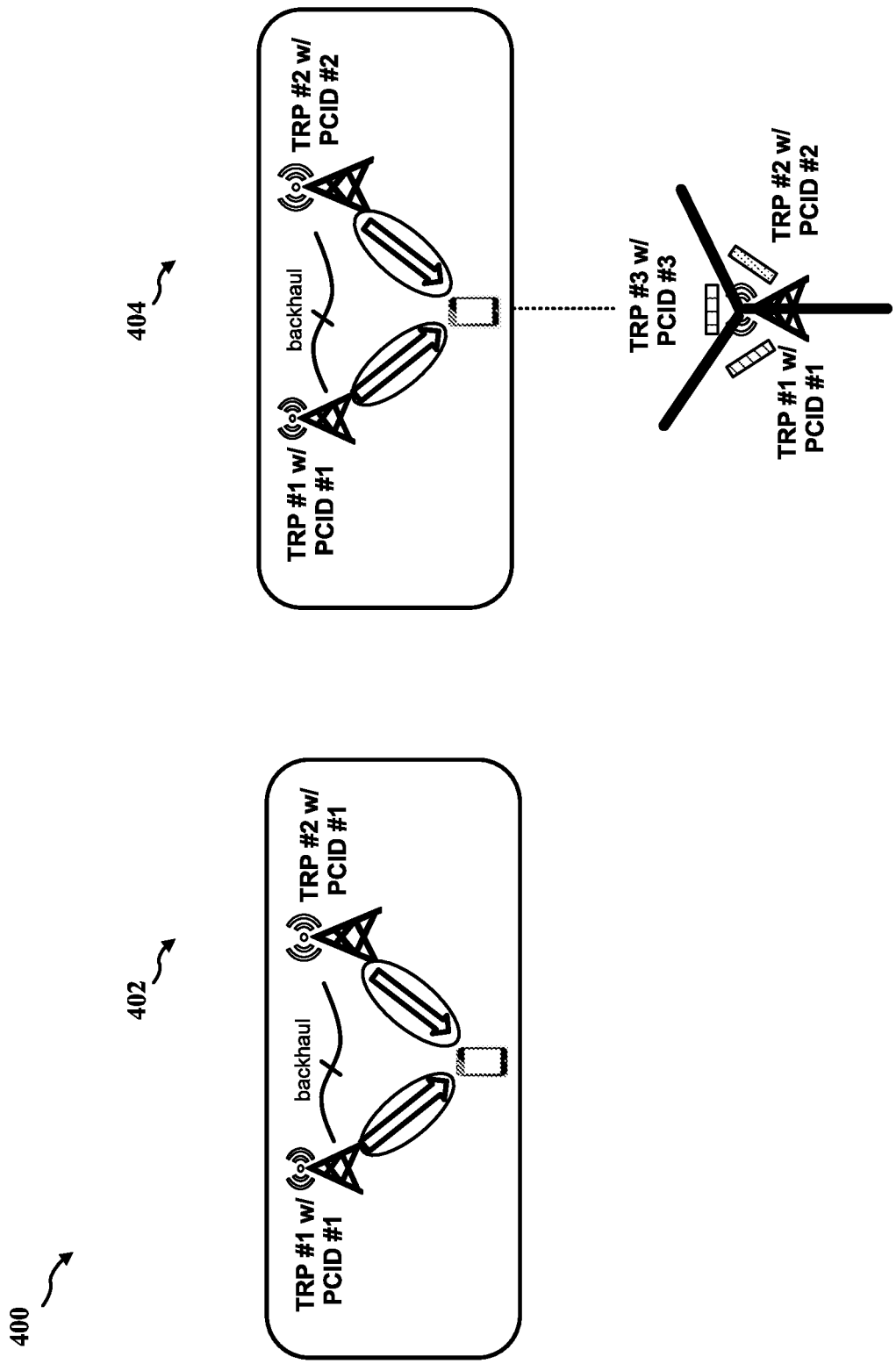
FIG. 4A illustrates examples of multiple transmission reception point (multi-TRP) operation scenarios.
Figure 4B:
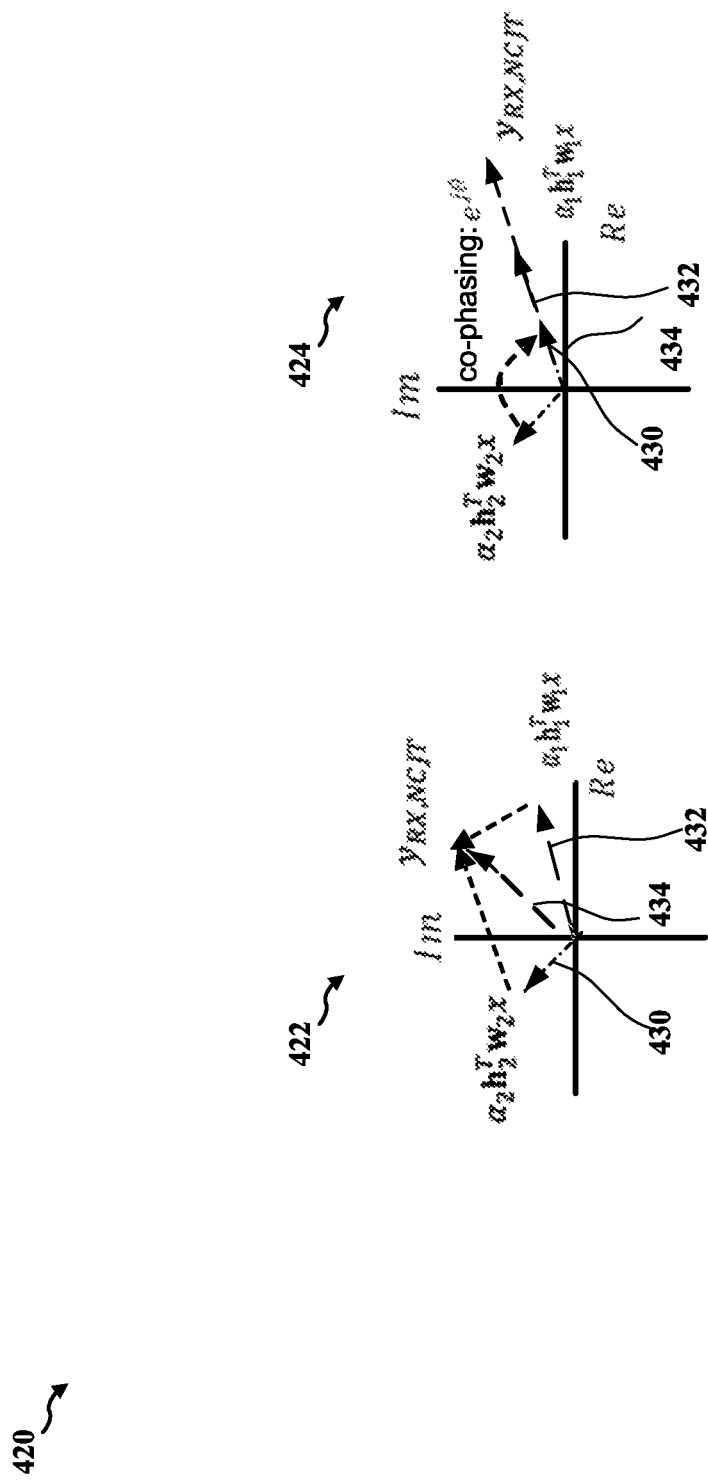
FIG. 4B is a representation of example coherent and non-coherent joint transmissions for a multi-TRP.
Figure 4C:
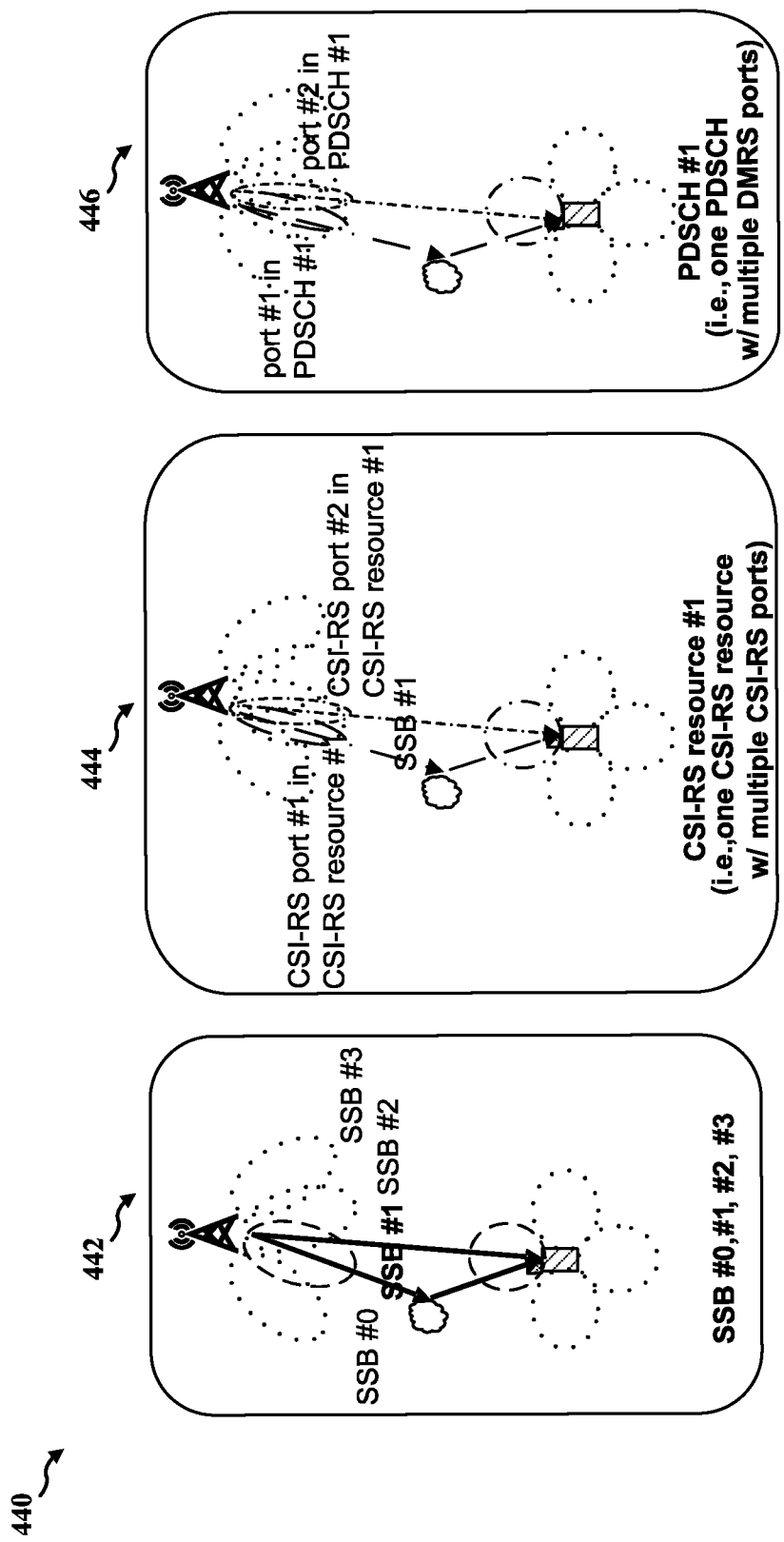
FIG. 4C is a conceptual diagram illustrating an example channel state information reference signal (CSI-RS) transmission for a single cell.
Figure 4D:
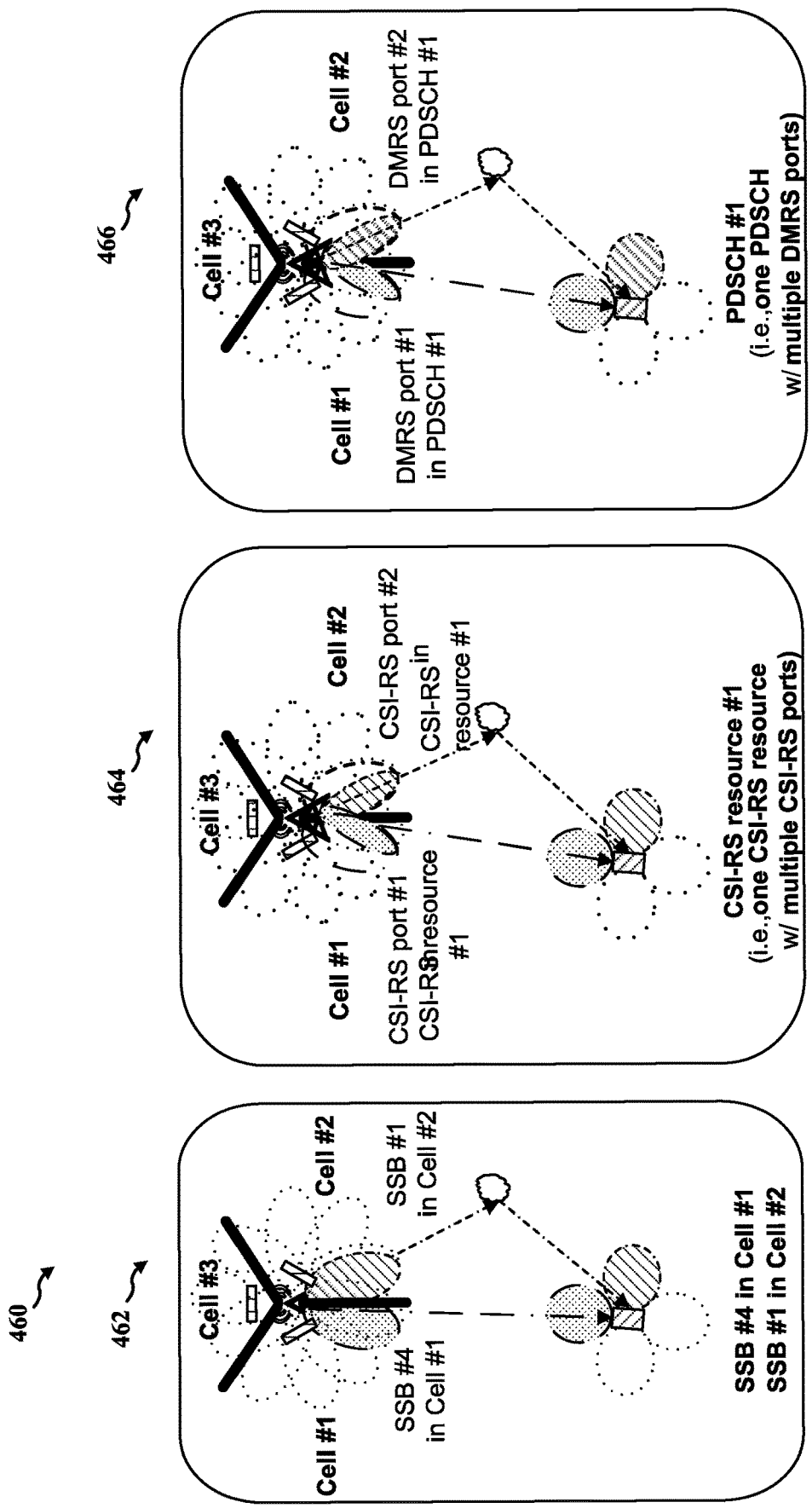
FIG. 4D is a conceptual diagram illustrating an example CSI-RS transmission for a multi-TRP cell.
Figure 5:
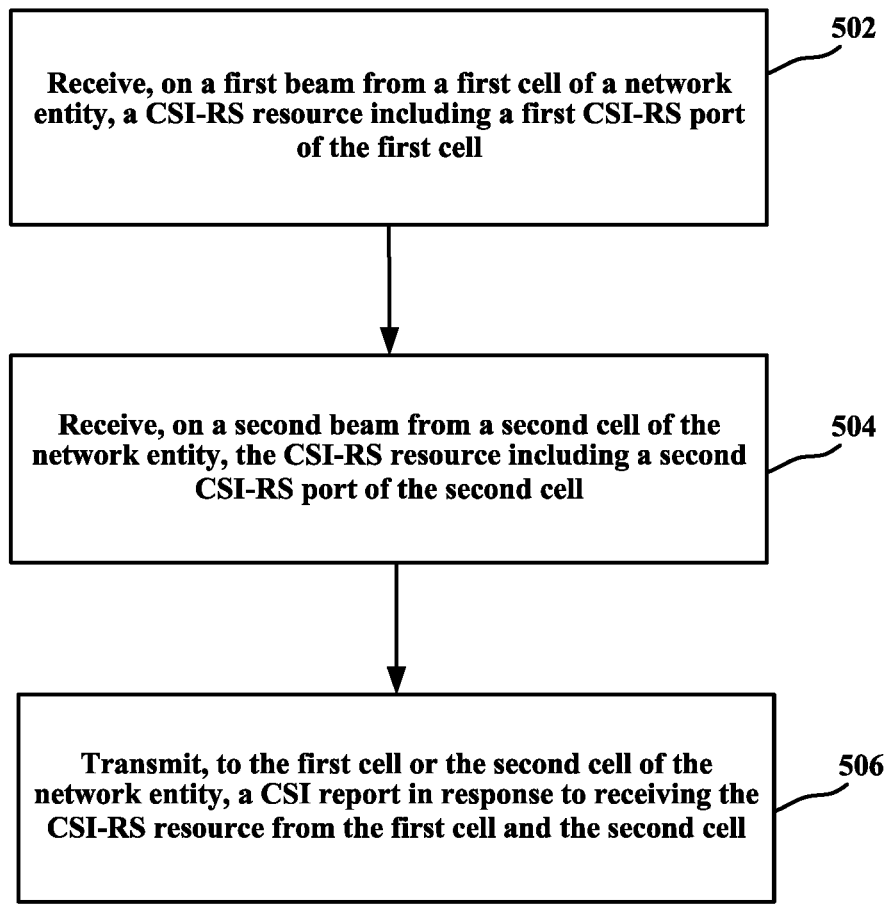
FIG. 5 is a flowchart of an example method of wireless communication at an apparatus of a UE.
Figure 6:
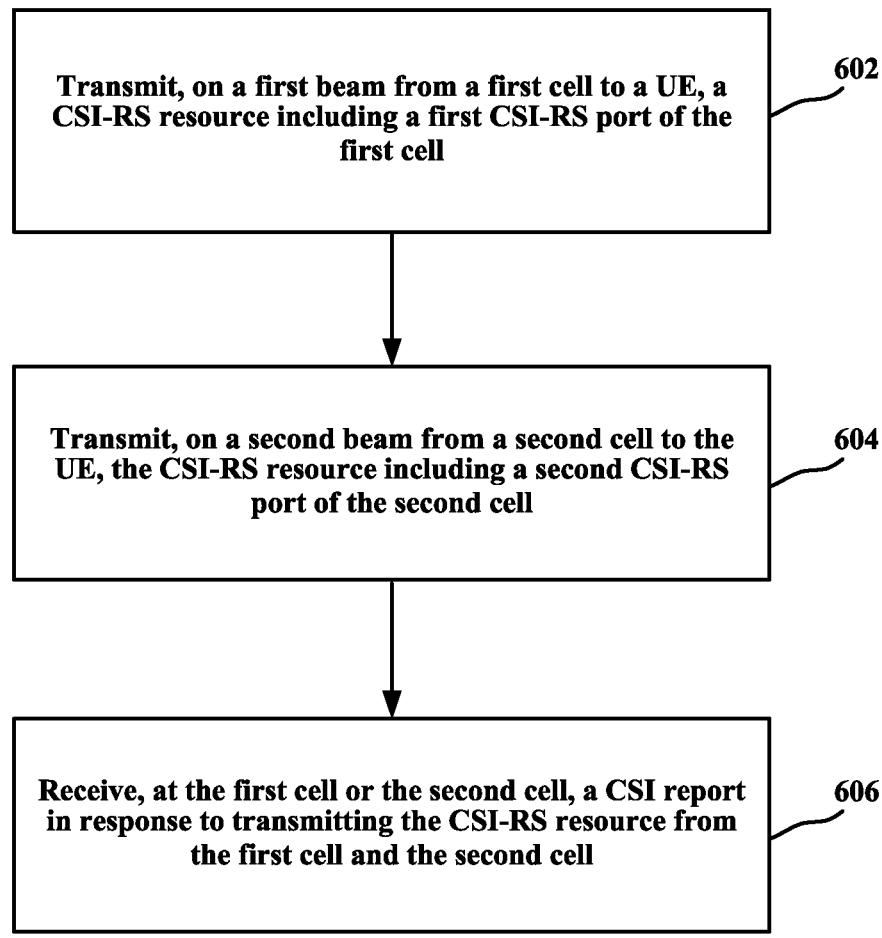
FIG. 6 is a flowchart of another example method of wireless communication at an apparatus of a network entity.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
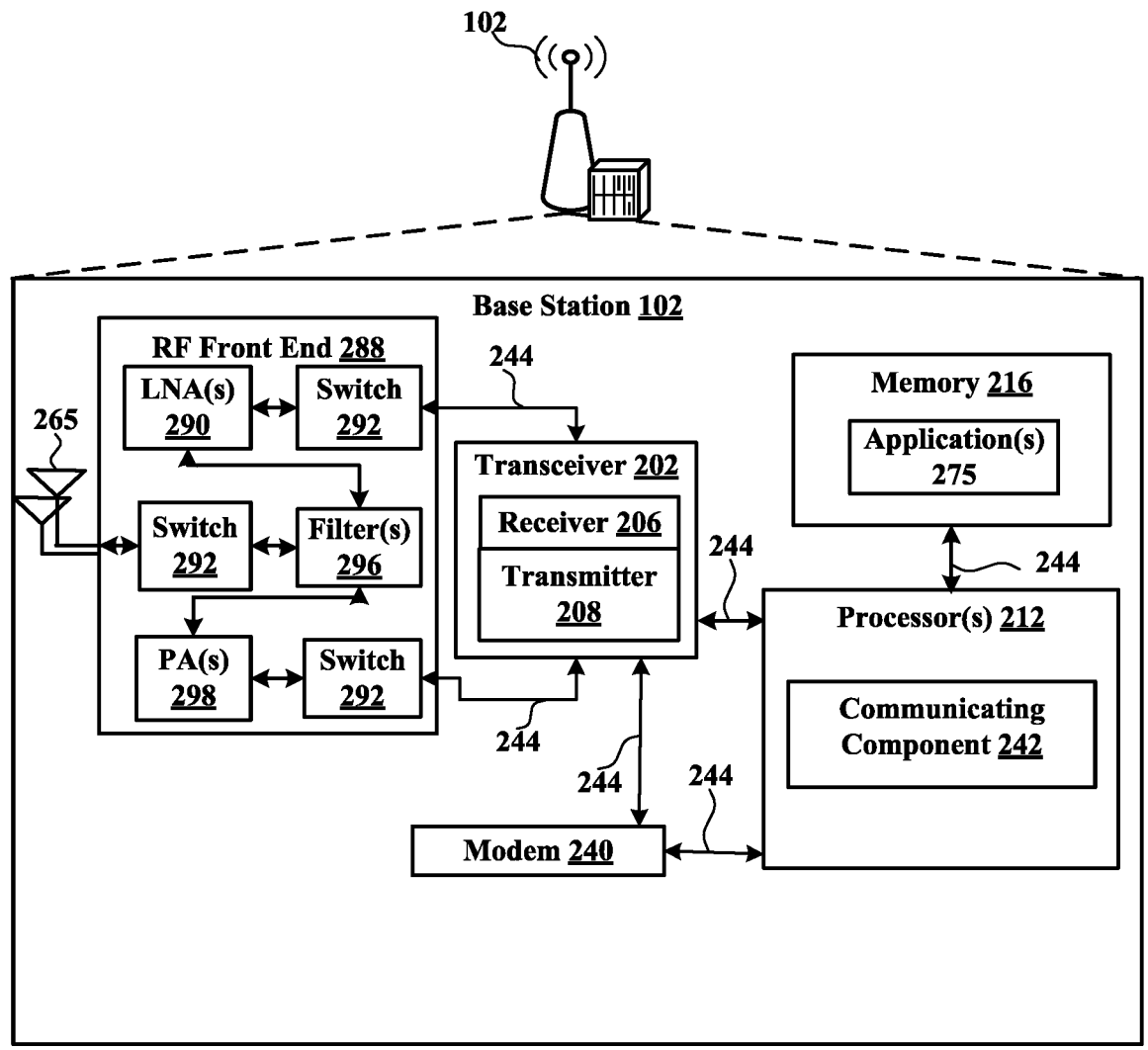
FIG. 2 is a block diagram illustrating an example of a network entity (also referred to as a base station (BS)).

FIG. 2 is a block diagram illustrating an example of a network entity (also referred to as a base station (BS) that may have multiple TRPs). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for coherent joint transmission for a multi-TRP having a different PCID by using a Type-II port selection codebook.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
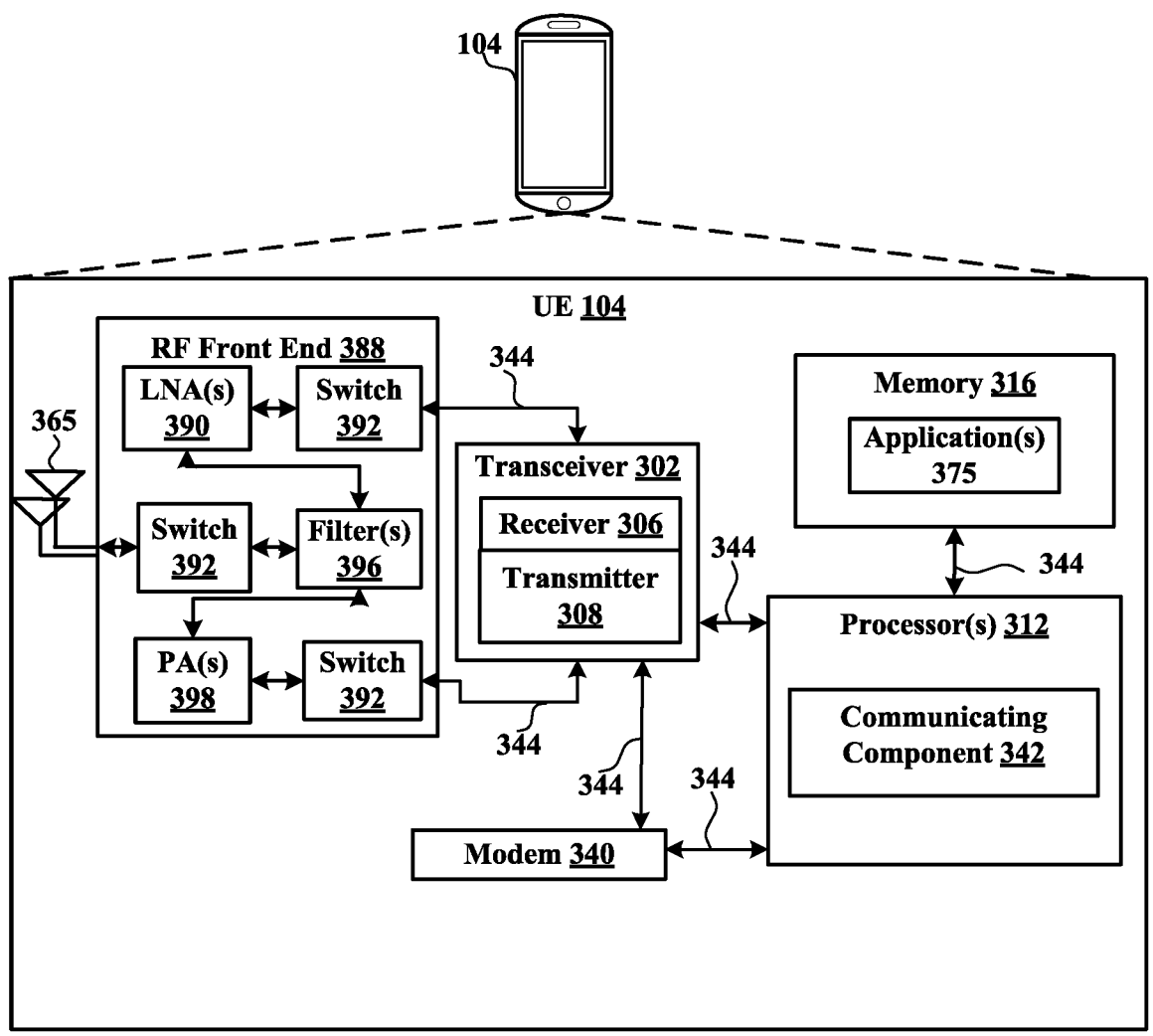
FIG. 3 is a block diagram illustrating an example of a user equipment (UE).

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 and configured for coherent joint transmission for a multi-transmit and receive point (TRP) having a different physical cell identifier (PCID) by using a Type-II port selection codebook.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A illustrates examples of multi-TRP operation scenarios 400. A first scenario 402, corresponds to multi-TRPs having the same PCID. In the first scenario 402, a first TRP (i.e., TRP #1) may be associated with a first PCID (i.e., PCID #1), and a second TRP (i.e., TRP #2) also may be associated with the same first PCID (i.e., PCID #1). A second scenario 404, corresponds to multi-TRPs having different PCIDs. In the second scenario 404, the first TRP (i.e., TRP #1) and the second TRP (i.e., TRP #2) may be associated with different PCIDs. For example, in the second scenario 404, the first TRP may be associated with a first PCID (i.e., PCID #1) and the second TRP may be associated with a second PCID (i.e., PCID #2) different from the first PCID. In one example of the second scenario, a network entity (i.e., a gNB) may include a first TRP (i.e., TRP #1) having a first PCID (i.e., PCID #1), a second TRP (i.e., TRP #2) having a second PCID (i.e., PCID #2), and a third TRP (i.e., TRP #3) having a third PCID (i.e., PCID #3).

FIG. 4B is a representation 420 of example coherent and non-coherent joint transmissions for a multi-TRP. For example, in some aspects, a non-coherent joint transmission 422, where the multi-TRPs may transmit the same signal without precoding, may be such that beams of different TRPs transmitting to a UE are out of phase. In particular, a first beam 430 from the first TRP (i.e., TRP #1), a second beam 432 from the second TRP (i.e., TRP #2), and a third beam 434 from the third TRP (i.e., TRP #3) may be transmitted in a non-coherent manner. The non-coherent joint transmission 422 may be represented as:

$$y_{RX,NCJT} = \alpha_1 h_1^T w_1 x + \alpha_2 h_2^T w_2 x$$

where w_k corresponds to a beam vector at TRP k and h_k^T corresponds to a channel vector between UE and TRP k. For a coherent joint transmission 424, which may be beneficial for transmissions of CSI-RS and PDSCH, the beams of the TRPs, some or all of which may be quasi co-located, may have similar phases. That is, a first beam 430 from the first TRP (i.e., TRP #1), a second beam 432 from the second TRP (i.e., TRP #2), and a third beam 434 from the third TRP (i.e., TRP #3) may be transmitted in a coherent manner. The coherent joint transmission 424 may be represented as:

$$y_{RX,CJT} = \alpha_1 h_1^T w_1 x + \alpha_2 e^{j\theta} h_2^T w_2 x$$

where $e^{j\theta}$ represents the co-phasing, w_k corresponds to a beam vector at TRP k, and h_k^T corresponds to a channel vector between UE and TRP k.

Typically, a non-coherent joint transmission 422 may be used for multi-TRP transmission due to backhaul delay. However, in some scenarios, the backhaul delay may be disregarded for a three sector network entity (i.e., gNB), where each sector has a distinct PCID. Consequently, coherent joint transmission may be possible for a multi-TRP, yet may be challenging due to different PCIDs as some implementations do not support coherent joint transmission when PCIDs are different. As such, to overcome such challenges, a Type-II port selection codebook may be implemented.

FIG. 4C is a conceptual diagram illustrating an example single cell Type II port selection codebook procedure 440. Specifically, at 442, the single cell (i.e., base station 102) may transmit a number of SSBs to a UE (such as the UE 104 depicted and described in FIGS. 1, 3 and 7). For example, the cell may broadcast SSBs (i.e., SSB #0, SSB #1, SSB #2, and SSB #3) via beam sweeping. The UE may select the beam(s) having a highest signal quality via receive beam sweeping. That is, the UE may select an SSB (i.e., SSB #1) considered the "best" in terms of signal quality relative to the other SSBs based on SSB measurements. Afterwards, the UE may indicate, to the cell, the SSB index associated with the selected transmit beam(s).

At 444, the cell may transmit a CSI-RS for a Type II port selection codebook. In particular, the CSI-RS resource may be quasi co-located with a single SSB (i.e., SSB #1). In other words, a single CSI-RS resource (i.e., CSI-RS resource #1) may have a single TCI state identifier (i.e., quasi co-location source) of the same cell. The cell (i.e., gNB) may configure one CSI-RS resource having multiple ports such that each port may be associated with a transmit beam. The CSI-RS resource may be quasi co-located with a first SSB. That is, the two transmit beams of the CSI-RS resource may be quasi co-located with a single SSB). As shown, the CSI-RS resource may include a first CSI-RS port (i.e., CSI-RS port #1) and a second CSI-RS port (i.e., CSI-RS port #2) of the same cell. The UE may transmit a CSI report using the CSI-RS resources (i.e., including amplitude and phases of each transmit beam) to the cell.

At 446, transmission of PDSCH data may occur. Specifically, the cell may determine the amplitudes and phases corresponding to the transmit beams based on the CSI report. The cell may transmit PDSCH (i.e., PDCH #1) via the determined precoding and beamforming to the UE on a first DMRS port (i.e., Port #1) and a second DMRS port (i.e., Port #2). In some implementations, the demodulation reference signal (DMRS) in the first PDSCH may be quasi co-located with the CSI-RS resource.

FIG. 4D is a conceptual diagram illustrating an example multi-TRP Type II port selection codebook procedure 460. Specifically, at 462, a first cell (i.e., first TRP) and a second cell (i.e., second TRP) of a network entity (i.e., base station 102) may each transmit SSBs via beam sweeping. For example, the first cell may transmit a first SSB (i.e., SSB #4) and the second cell may transmit a second SSB (i.e., SSB #1) to the UE. The UE may select a beam per cell having a highest signal quality via receive beam sweeping. That is, the UE may select a first SSB (i.e., SSB #1) for the first cell and a second SSB (i.e., SSB #1) considered the best in terms of signal quality relative to the other SSBs based on SSB measurements. The UE may inform the gNB of the SSB index per cell associated with the selected transmit beam(s).

At 464, the first cell and the second cell may transmit a CSI-RS resource (i.e., CSI-RS resource #1) in a quasi-co-located manner. That is, the CSI-RS resource may be quasi co-located with the first SSB (i.e., SSB #4) and the second SSB (i.e., SSB #1). Hence, a single CSI-RS resource may have multiple TCI state identifiers (i.e., quasi co-located sources) of different cells. For example, the gNB (such as the base station (BS) 102 depicted and described in FIGS. 1, 2 and 7) may configure one CSI-RS resource having multiple ports (i.e., each port may be associated with a transmit beam).

In particular, the CSI-RS resource may include or otherwise be associated with a first CSI-RS port (i.e., CSI port #1) of the first cell and a second CSI-RS port (i.e., CSI port #2) of the second cell. The CSI-RS resource may be quasi co-located with the first SSB (i.e., SSB #4) and the second SSB (SSB #1) (i.e., the two transmit beams of the CSI-RS resources may be quasi co-located with two SSBs of different cells). Upon receiving the CSI-RS resource on the quasi co-located, the UE may transmit a CSI report including at least amplitude and phases of each transmit beam to the gNB.

At 466, a multi-TRP PDSCH transmission may occur. For example, a single PDSCH (i.e., PDSCH #1) may be associated with or otherwise include multiple DMRS ports (i.e., first DMRS port (DMRS port #1) of first cell and second DMRS port (DMRS port #2) of second cell). The gNB (i.e., base station 102) may determine the amplitudes and phases corresponding to the transmit beams for multiple TRPs based on the received CSI report. The gNB may perform a PDSCH transmission from multiple TRPs (i.e., PDSCH #1 and PDSCH #2) via the determined precoding and beamforming on a first DMRS port (i.e., DMRS port #1) and a second DMRS port (i.e., DMRS port #2). In some implementations, the DMRS in the first PDSCH may be quasi co-located with the CSI-RS resource.

FIG. 5 is a flowchart of an example method 500 of wireless communication at an apparatus of a UE. In an example, a UE, such as the UE 104 depicted and described in FIGS. 1, 3 and 7, or components thereof, can perform the functions described in method 500.

At block 502, a CSI-RS resource including a first CSI-RS port of the first cell may be received on a first beam from a first cell of a network entity. In some aspects, the communicating component 342, such as in conjunction with processor(s) 312, memory 316, modem 340, transceiver 302, RF front end 388 or antenna(s) 365, may be configured to receive, on a first beam from a first cell of a network entity, a CSI-RS resource including a first CSI-RS port of the first cell. Thus, the UE 104, the processor(s) 312, the communicating component 342 or one of its subcomponents may define the means for receiving, on a first beam from a first cell of a network entity, a CSI-RS resource including a first CSI-RS port of the first cell. For example, to receive the CSI-RS resource including a first CSI-RS port of the first cell on a first beam from a first cell of a network entity, the processor 312 of the UE 104 may activate the transceiver 302 and associated RF front end 388 components.

At block 504, the CSI-RS resource including a second CSI-RS port of the second cell is received on a second beam from a second cell of the network entity. In some aspects, the communicating component 342, such as in conjunction with processor(s) 312, memory 316, modem 340, transceiver 302, RF front end 388 or antenna(s) 365, may be configured to receive, on a second beam from a second cell of the network entity, the CSI-RS resource including a second CSI-RS port of the second cell. Thus, the UE 104, the processor(s) 312, the communicating component 342 or one of its subcomponents may define the means for receiving, on a second beam from a second cell of the network entity, the CSI-RS resource including a second CSI-RS port of the second cell. For example, the processor 312 of the UE 104 may activate the transceiver 302 and associated RF front end 388 components to further receive the CSI-RS resource including a second CSI-RS port of the second cell on a second beam from a second cell.

In some implementations, the first beam may be associated with the first CSI-RS port of the first cell and the second beam may be associated with the second CSI-RS port of the second cell.

In some implementations, the first CSI-RS port of the CSI-RS resource may be quasi co-located with a first SSB or a third CSI-RS of the first cell, and the second CSI-RS port of the CSI-RS resource may be quasi co-located with a second SSB or a fourth CSI-RS of the second cell.

In some implementations, the CSI-RS resource may be associated with multiple transmission configuration indicator (TCI) state identifiers of the first cell and the second cell, each of the multiple TCI state identifiers indicating a distinct quasi co-location source.

At block 506, in response to receiving the CSI-RS resource from the first cell and the second cell, a CSI report is transmitted to the first cell or the second cell of the network entity. In some aspects, the communicating component 342, such as in conjunction with processor(s) 312, memory 316, modem 340, transceiver 302, RF front end 388 or antenna(s) 365, may be configured to transmit, to the first cell or the second cell of the network entity, a CSI report in response to receiving the CSI-RS resource from the first cell and the second cell. Thus, the UE 104, the processor(s) 312, the communicating component 342 or one of its subcomponents may define the means for transmitting, to the first cell or the second cell of the network entity, a CSI report in response to receiving the CSI-RS resource from the first cell and the second cell. For example, the CSI report may be transmitted based on the processor 312 of the UE 104 activating the transceiver 302 and associated RF front end 388 components.

In some implantations, the CSI report may include at least one of an amplitude or phase of the first beam and the second beam.

Although not shown, the method 500 may include receiving a PDSCH transmission on the first beam from the first cell and the second beam from the second cell in response to transmitting the CSI report, where the first beam is associated with a first DMRS port and the second beam is associated with a second DMRS port. In some aspects, the communicating component 342, such as in conjunction with processor(s) 312, memory 316, modem 340, transceiver 302, RF front end 388, or antenna(s) 365, may be configured to receive a PDSCH transmission on the first beam from the first cell and the second beam from the second cell in response to transmitting the CSI report, where the first beam is associated with a first DMRS port and the second beam is associated with a second DMRS port. Thus, the UE 104, the processor(s) 312, the communicating component 342 or one of its subcomponents may define the means for receiving a PDSCH transmission on the first beam from the first cell and the second beam from the second cell in response to transmitting the CSI report, where the first beam is associated with a first DMRS port and the second beam is associated with a second DMRS port.

In some implementations, the first DMRS port and the second DMRS port may be quasi co-located with the first CSI-RS port and the second CSI-RS port in the CSI resource.

Although not shown, the method 500 may further include receiving a first set of SSBs from the first cell of the network entity, and a second set of SSBs from the second cell of the network entity. In some aspects, the communicating component 342, such as in conjunction with processor(s) 312, memory 316, modem 340, transceiver 302, RF front end 388, or antenna(s) 365, may be configured to receive a first set of SSBs from the first cell of the network entity, and a second set of SSBs from the second cell of the network entity. Thus, the UE 104, the processor(s) 312, the communicating component 342 or one of its subcomponents may define the means for receiving a first set of SSBs from the first cell of the network entity, and a second set of SSBs from the second cell of the network entity.

Although not shown, the method 500 may further include selecting a first SSB having a highest signal quality corresponding to the first beam from the first set of SSBs and a second SSB having a highest signal quality corresponding to the second beam from the second set of SSBs based on an SSB measurement, the first SSB and the second SSB are quasi co-located. In some aspects, the communicating component 342, such as in conjunction with processor(s) 312, memory 316, modem 340, or transceiver 302, may be configured to select a first SSB having a highest signal quality corresponding to the first beam from the first set of SSBs and a second SSB having a highest signal quality corresponding to the second beam from the second set of SSBs based on an SSB measurement, the first SSB and the second SSB are quasi co-located. Thus, the UE 104, the processor(s) 312, the communicating component 342 or one of its subcomponents may define the means for selecting a first SSB having a highest signal quality corresponding to the first beam from the first set of SSBs and a second SSB having a highest signal quality corresponding to the second beam from the second set of SSBs based on an SSB measurement, the first SSB and the second SSB are quasi co-located.

Although not shown, the method 500 may further include transmitting, to the network entity, a first SSB index including the first SSB of the first cell and a second SSB index including the second SSB of the second cell. In some aspects, the communicating component 342, such as in conjunction with processor(s) 312, memory 316, modem 340, transceiver 302, RF front end 388, or antenna(s) 365, may be configured to transmit, to the network entity, a first SSB index including the first SSB of the first cell and a second SSB index including the second SSB of the second cell. Thus, the UE 104, the processor(s) 312, the communicating component 342 or one of its subcomponents may define the means for transmitting, to the network entity, a first SSB index including the first SSB of the first cell and a second SSB index including the second SSB of the second cell.

FIG. 6 is a flowchart of another example method 600 for wireless communication at an apparatus of a network entity. In an example, a base station, such as the BS 102 depicted and described in FIGS. 1, 2 and 7, or components thereof, can perform the functions described in method 600.

At block 602, a network entity may transmit, on a first beam from a first cell to a UE, a CSI-RS resource including a first CSI-RS port of the first cell. In some aspects, the communicating component 242, such as in conjunction with processor(s) 212, memory 216, modem 240, transceiver 202, RF front end 288, or antenna(s) 265, may be configured to transmit, on a first beam from a first cell to a UE, a CSI-RS resource including a first CSI-RS port of the first cell. Thus, the base station 102, the processor(s) 212, the communicating component 242 or one of its subcomponents may define the means for transmitting, on a first beam from a first cell to a UE, a CSI-RS resource including a first CSI-RS port of the first cell. For example, to transmit a first beam from a first cell to a UE, a CSI-RS resource including a first CSI-RS port of the first cell, the processor 212 of the base station 102 may activate the transceiver 202 and associated RF front end 288 components.

At block 604, the network entity may transmit, on a second beam from a second cell to the UE, the CSI-RS resource including a second CSI-RS port of the second cell. In some aspects, the communicating component 242, such as in conjunction with processor(s) 212, memory 216, modem 240, transceiver 202, RF front end 288, or antenna(s) 265, may be configured to transmit, on a second beam from a second cell to the UE, the CSI-RS resource including a second CSI-RS port of the second cell. Thus, the base station 102, the processor(s) 212, the communicating component 242 or one of its subcomponents may define the means for transmitting, on a second beam from a second cell to the UE, the CSI-RS resource including a second CSI-RS port of the second cell. For example, the processor 212 of the base station 102 may activate the transceiver 202 and associated RF front end 288 components to transmit, on a second beam from a second cell to the UE, the CSI-RS resource including a second CSI-RS port of the second cell.

In some implementations, the first beam may be associated with the first CSI-RS port of the first cell and the second beam is associated with the second CSI-RS port of the second cell.

In some implementations, the first CSI-RS port of the CSI-RS resource may be quasi co-located with a first SSB or a third CSI-RS of the first cell, and the second CSI-RS port of the CSI-RS resource may be quasi co-located with a second SSB or a fourth CSI-RS of the second cell.

In some implementations, the CSI-RS resource may be associated with multiple TCI state identifiers of the first cell and the second cell, each of the multiple TCI state identifiers may indicate a distinct quasi co-location source.

At block 606, the network entity may receive, at the first cell or the second cell, a CSI report in response to transmitting the CSI-RS resource from the first cell and the second cell. In some aspects, the communicating component 242, such as in conjunction with processor(s) 212, memory 216, modem 240, transceiver 202, RF front end 288, or antenna(s) 265, may be configured to receive, at the first cell or the second cell, a CSI report in response to transmitting the CSI-RS resource from the first cell and the second cell. Thus, the base station 102, the processor(s) 212, the communicating component 242 or one of its subcomponents may define the means for receiving, at the first cell or the second cell, a CSI report in response to transmitting the CSI-RS resource from the first cell and the second cell. For example, the processor 212 of the base station 102 may activate the transceiver 202 and associated RF front end 288 components to receive, at the first cell or the second cell, a CSI report in response to transmitting the CSI-RS resource from the first cell and the second cell.

In some implementations, the CSI report may include at least one of an amplitude or phase of the first beam and the second beam.

Although not shown, the method 600 may further include transmitting a PDSCH transmission on the first beam from the first cell and the second beam from the second cell in response to transmitting the CSI report, where the first beam is associated with a first DMRS port and the second beam is associated with a second DMRS port. In some aspects, the communicating component 242, such as in conjunction with processor(s) 212, memory 216, modem 240, transceiver 202, RF front end 288, or antenna(s) 265, may be configured to transmit a PDSCH transmission on the first beam from the first cell and the second beam from the second cell in response to transmitting the CSI report, where the first beam is associated with a first DMRS port and the second beam is associated with a second DMRS port. Thus, the base station 102, the processor(s) 212, the communicating component 242 or one of its subcomponents may define the means for transmitting a PDSCH transmission on the first beam from the first cell and the second beam from the second cell in response to transmitting the CSI report, where the first beam is associated with a first DMRS port and the second beam is associated with a second DMRS port.

In some implementations, the first DMRS port and the second DMRS port may be quasi co-located with the first CSI-RS port and the second CSI-RS port in the CSI resource.

Although not shown, the method 600 may further include transmitting, to the UE, a first set of SSBs including a first SSB from the first cell, and a second set of SSBs including a second SSB from the second cell, where the first SSB and the second SSB are quasi co-located. In some aspects, the communicating component 242, such as in conjunction with processor(s) 212, memory 216, modem 240, transceiver 202, RF front end 288, or antenna(s) 265, may be configured to transmit, to the UE, a first set of SSBs including a first SSB from the first cell, and a second set of SSBs including a second SSB from the second cell, where the first SSB and the second SSB are quasi co-located. Thus, the base station 102, the processor(s) 212, the communicating component 242 or one of its subcomponents may define the means for transmitting, to the UE, a first set of SSBs including a first SSB from the first cell, and a second set of SSBs including a second SSB from the second cell, where the first SSB and the second SSB are quasi co-located.

Although not shown, the method 600 may further include receiving, from the UE, a first SSB index including the first SSB of the first cell and a second SSB index including the second SSB of the second cell. In some aspects, the communicating component 242, such as in conjunction with processor(s) 212, memory 216, modem 240, transceiver 202, RF front end 288, or antenna(s) 265, may be configured to receive, from the UE, a first SSB index including the first SSB of the first cell and a second SSB index including the second SSB of the second cell. Thus, the base station 102, the processor(s) 212, the communicating component 242 or one of its subcomponents may define the means for receiving, from the UE, a first SSB index including the first SSB of the first cell and a second SSB index including the second SSB of the second cell.

Figure 7:
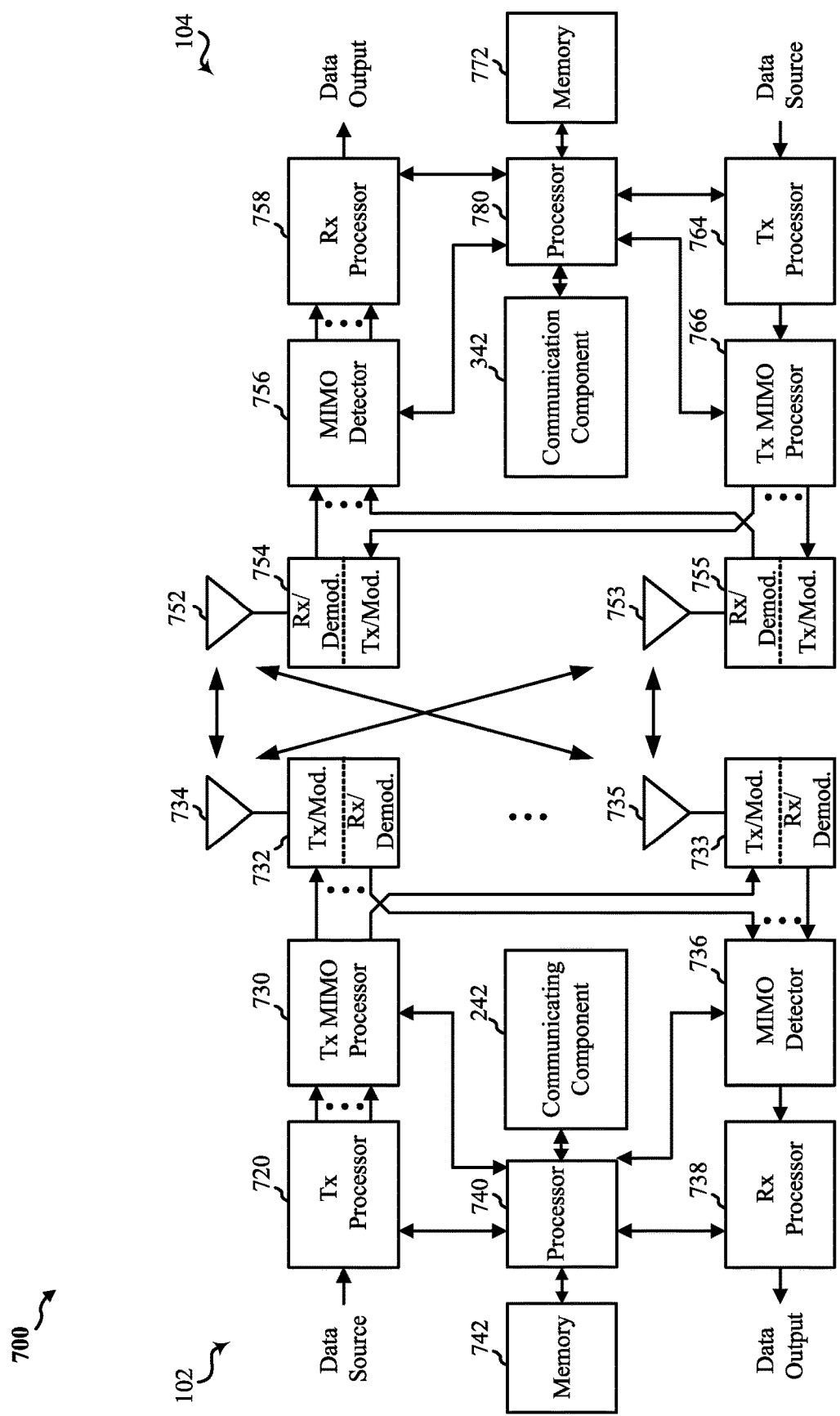
FIG. 7 is a block diagram illustrating an example of a MIMO communication system including a BS and a UE.

FIG. 7 is a block diagram of a MIMO communication system 700 including a base station 102 (such as the base station 102 depicted and described in FIGS. 1, 2 and 7) and a UE 104 (such as the UE 104 depicted and described in FIGS. 1, 3 and 7). The MIMO communication system 700 may be configured to facilitate multi-TRP transmission using a Type II port selection codebook described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 772.

The processor 780 may in some cases execute stored instructions to instantiate a communicating component 242 (such as FIGS. 1 and 2). The processor 720 may in some cases execute stored instructions to instantiate a communicating component 342 (such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The aspects described herein additionally include one or more of the following aspect examples described in the following numbered clauses.

1. A method of communication at an apparatus of a user equipment (UE), including:
receiving, on a first beam from a first cell of a network entity, a channel state information reference signal (CSI-RS) resource including a first CSI-RS port of the first cell;
receiving, on a second beam from a second cell of the network entity, the CSI-RS resource including a second CSI-RS port of the second cell; and
transmitting, to the first cell or the second cell of the network entity, a CSI report in response to receiving the CSI-RS resource from the first cell and the second cell.

2. The method of any preceding clause, where the first beam is associated with the first CSI-RS port of the first cell and the second beam is associated with the second CSI-RS port of the second cell.

3. The method of any preceding clause, where the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

4. The method of any preceding clause, where the CSI-RS resource is associated with multiple transmission configuration indicator (TCI) state identifiers of the first cell and the second cell, each of the multiple TCI state identifiers indicating a distinct quasi co-location source.

5. The method of any preceding clause, where the CSI report includes at least one of an amplitude or phase of the first beam and the second beam.

6. The method of any preceding clause, further including receiving a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

7. The method of any preceding clause, where the first DMRS port and the second DMRS port are quasi co-located with the first CSI-RS port and the second CSI-RS port in the CSI resource.

8. The method of any preceding clause, further including receiving a first set of synchronization signal block (SSBs) from the first cell of the network entity, and a second set of SSBs from the second cell of the network entity.

9. The method of any preceding clause, further including selecting a first SSB having a highest signal quality corresponding to the first beam from the first set of SSBs and a second SSB having a highest signal quality corresponding to the second beam from the second set of SSBs based on an SSB measurement, where the first SSB and the second SSB are quasi co-located.

10. The method of any preceding clause, further including transmitting, to the network entity, a first SSB index including the first SSB of the first cell and a second SSB index including the second SSB of the second cell.

11. A method of communication at an apparatus of a network entity, including:
transmitting, on a first beam from a first cell to a user equipment (UE), a channel state information reference signal (CSI-RS) resource including a first CSI-RS port of the first cell;
transmitting, on a second beam from a second cell to the UE, the CSI-RS resource including a second CSI-RS port of the second cell; and
receiving, at the first cell or the second cell, a CSI report in response to transmitting the CSI-RS resource from the first cell and the second cell.

12. The method of clause 11, where the first beam is associated with the first CSI-RS port of the first cell and the second beam is associated with the second CSI-RS port of the second cell.

13. The method of any preceding clause, where the first CSI-RS port of the CSI-RS resource is quasi co-located with a first SSB or a third CSI-RS resource of the first cell, and the second CSI-RS port of the CSI-RS resource is quasi co-located with a second SSB or a fourth CSI-RS resource of the second cell.

14. The method of any preceding clause, where the CSI-RS resource is associated with multiple transmission configuration indicator (TCI) state identifiers of the first cell and the second cell, each of the multiple TCI state identifiers indicating a distinct quasi co-location source.

15. The method of any preceding clause, where the CSI report includes at least one of an amplitude or phase of the first beam and the second beam.

16. The method of any preceding clause, further including transmitting a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

17. The method of any preceding clause, where the first DMRS port and the second DMRS port are quasi co-located with the first CSI-RS port and the second CSI-RS port in the CSI resource.

18. The method of any preceding clause, further including transmitting, to the UE, a first set of synchronization signal block (SSBs) including a first SSB from the first cell, and a second set of SSBs including a second SSB from the second cell, where the first SSB and the second SSB are quasi co-located.

19. The method of any preceding clause, further including receiving, from the UE, a first SSB index including the first SSB of the first cell and a second SSB index including the second SSB of the second cell.

20. An apparatus for wireless communication, including:
a transceiver;
a memory configured to store instructions; and
at least one processor communicatively coupled with the transceiver and the memory, where the at least one processor is configured to:
receive, on a first beam from a first cell of a network entity, a channel state information reference signal (CSI-RS) resource including a first CSI-RS port of the first cell;
receive, on a second beam from a second cell of the network entity, the CSI-RS resource including a second CSI-RS port of the second cell; and
transmit, to the first cell or the second cell of the network entity, a CSI report in response to receiving the CSI-RS resource from the first cell and the second cell.

21. The apparatus of clause 20, where the first beam is associated with the first CSI-RS port of the first cell and the second beam is associated with the second CSI-RS port of the second cell.

22. The apparatus of any preceding clause, where the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

23. The apparatus of any preceding clause, where the CSI-RS resource is associated with multiple transmission configuration indicator (TCI) state identifiers of the first cell and the second cell, each of the multiple TCI state identifiers indicating a distinct quasi co-location source.

24. The apparatus of any preceding clause, where the CSI report includes at least one of an amplitude or phase of the first beam and the second beam.

25. The apparatus of any preceding clause, where the at least one processor is further configured to receive a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

26. The apparatus of any preceding clause, where the first DMRS port and the second DMRS port are quasi co-located with the first CSI-RS port and the second CSI-RS port in the CSI resource.

27. The apparatus of any preceding clause, where the at least one processor is further configured to receive a first set of synchronization signal block (SSBs) from the first cell of the network entity, and a second set of SSBs from the second cell of the network entity.

28. The apparatus of any preceding clause, where the at least one processor is further configured to select a first SSB having a highest signal quality corresponding to the first beam from the first set of SSBs and a second SSB having a highest signal quality corresponding to the second beam from the second set of SSBs based on an SSB measurement, where the first SSB and the second SSB are quasi co-located.

29. The apparatus of any preceding clause, where the at least one processor is further configured to transmit, to the network entity, a first SSB index including the first SSB of the first cell and a second SSB index including the second SSB of the second cell.

30. An apparatus for wireless communication, including:
a transceiver;
a memory configured to store instructions; and
at least one processor communicatively coupled with the transceiver and the memory, where the at least one processor is configured to:
transmit, on a first beam from a first cell to a user equipment (UE), a channel state information reference signal (CSI-RS) resource including a first CSI-RS port of the first cell;
transmit, on a second beam from a second cell to the UE, the CSI-RS resource including a second CSI-RS port of the second cell; and
receive, at the first cell or the second cell, a CSI report in response to transmitting the CSI-RS resource from the first cell and the second cell.

31. The apparatus of clause 30, where the first beam is associated with the first CSI-RS port of the first cell and the second beam is associated with the second CSI-RS port of the second cell.

32. The apparatus of any preceding clause, where the first CSI-RS port of the CSI-RS resource is quasi co-located with a first SSB or a third CSI-RS resource of the first cell, and the second CSI-RS port of the CSI-RS resource is quasi co-located with a second SSB or a fourth CSI-RS resource of the second cell.

33. The apparatus of any preceding clause, where the CSI-RS resource is associated with multiple transmission configuration indicator (TCI) state identifiers of the first cell and the second cell, each of the multiple TCI state identifiers indicating a distinct quasi co-location source.

34. The apparatus of any preceding clause, where the CSI report includes at least one of an amplitude or phase of the first beam and the second beam.

35. The apparatus of any preceding clause, where the at least one processor is further configured to transmit a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

36. The apparatus of any preceding clause, where the first DMRS port and the second DMRS port are quasi co-located with the first CSI-RS port and the second CSI-RS port in the CSI resource.

37. The apparatus of any preceding clause, where the at least one processor is further configured to transmit, to the UE, a first set of synchronization signal block (SSBs) including a first SSB from the first cell, and a second set of SSBs including a second SSB from the second cell, where the first SSB and the second SSB are quasi co-located.

38. The apparatus of any preceding clause, where the at least one processor is further configured to receive, from the UE, a first SSB index including the first SSB of the first cell and a second SSB index including the second SSB of the second cell.

39. An apparatus for wireless communication, including:
means for receiving, on a first beam from a first cell of a network entity, a channel state information reference signal (CSI-RS) resource including a first CSI-RS port of the first cell;
means for receiving, on a second beam from a second cell of the network entity, the CSI-RS resource including a second CSI-RS port of the second cell; and
means for transmitting, to the first cell or the second cell of the network entity, a CSI report in response to receiving the CSI-RS resource from the first cell and the second cell.

40. The apparatus of clause 39, where the first beam is associated with the first CSI-RS port of the first cell and the second beam is associated with the second CSI-RS port of the second cell.

41. The apparatus of any preceding clause, where the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

42. The apparatus of any preceding clause, where the CSI-RS resource is associated with multiple transmission configuration indicator (TCI) state identifiers of the first cell and the second cell, each of the multiple TCI state identifiers indicating a distinct quasi co-location source.

43. The apparatus of any preceding clause, where the CSI report includes at least one of an amplitude or phase of the first beam and the second beam.

44. The apparatus of any preceding clause, further including means for receiving a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

45. The apparatus of any preceding clause, where the first DMRS port and the second DMRS port are quasi co-located with the first CSI-RS port and the second CSI-RS port in the CSI resource.

46. The apparatus of any preceding clause, further including means for receiving a first set of synchronization signal block (SSBs) from the first cell of the network entity, and a second set of SSBs from the second cell of the network entity.

47. The apparatus of any preceding clause, further including means for selecting a first SSB having a highest signal quality corresponding to the first beam from the first set of SSBs and a second SSB having a highest signal quality corresponding to the second beam from the second set of SSBs based on an SSB measurement, where the first SSB and the second SSB are quasi co-located.

48. The apparatus of any preceding clause, further including means for transmitting, to the network entity, a first SSB index including the first SSB of the first cell and a second SSB index including the second SSB of the second cell.

49. An apparatus for wireless communication, including:
means for transmitting, on a first beam from a first cell to a user equipment (UE), a channel state information reference signal (CSI-RS) resource including a first CSI-RS port of the first cell;
means for transmitting, on a second beam from a second cell to the UE, the CSI-RS resource including a second CSI-RS port of the second cell; and
means for receiving, at the first cell or the second cell, a CSI report in response to transmitting the CSI-RS resource from the first cell and the second cell.

50. The apparatus of clause 49, where the first beam is associated with the first CSI-RS port of the first cell and the second beam is associated with the second CSI-RS port of the second cell.

51. The apparatus of any preceding clause, where the first CSI-RS port of the CSI-RS resource is quasi co-located with a first SSB or a third CSI-RS resource of the first cell, and the second CSI-RS port of the CSI-RS resource is quasi co-located with a second SSB or a fourth CSI-RS resource of the second cell.

52. The apparatus of any preceding clause, where the CSI-RS resource is associated with multiple transmission configuration indicator (TCI) state identifiers of the first cell and the second cell, each of the multiple TCI state identifiers indicating a distinct quasi co-location source.

53. The apparatus of any preceding clause, where the CSI report includes at least one of an amplitude or phase of the first beam and the second beam.

54. The apparatus of any preceding clause, further including means for transmitting a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

55. The apparatus of any preceding clause, where the first DMRS port and the second DMRS port are quasi co-located with the first CSI-RS port and the second CSI-RS port in the CSI resource.

56. The apparatus of any preceding clause, further including means for transmitting, to the UE, a first set of synchronization signal block (SSBs) including a first SSB from the first cell, and a second set of SSBs including a second SSB from the second cell, where the first SSB and the second SSB are quasi co-located.

57. The apparatus of any preceding clause, further including means for receiving, from the UE, a first SSB index including the first SSB of the first cell and a second SSB index including the second SSB of the second cell.

58. A computer-readable medium storing computer executable code, the code when executed by a processor cause the processor to:
receive, on a first beam from a first cell of a network entity, a channel state information reference signal (CSI-RS) resource including a first CSI-RS port of the first cell;
receive, on a second beam from a second cell of the network entity, the CSI-RS resource including a second CSI-RS port of the second cell; and
transmit, to the first cell or the second cell of the network entity, a CSI report in response to receiving the CSI-RS resource from the first cell and the second cell.

59. The computer-readable medium of clause 58, where the first beam is associated with the first CSI-RS port of the first cell and the second beam is associated with the second CSI-RS port of the second cell.

60. The computer-readable medium of any preceding clause, where the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

61. The computer-readable medium of any preceding clause, where the CSI-RS resource is associated with multiple transmission configuration indicator (TCI) state identifiers of the first cell and the second cell, each of the multiple TCI state identifiers indicating a distinct quasi co-location source.

62. The computer-readable medium of any preceding clause, where the CSI report includes at least one of an amplitude or phase of the first beam and the second beam.

63. The computer-readable medium of any preceding clause, further including code causing the processor to receive a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

64. The computer-readable medium of any preceding clause, where the first DMRS port and the second DMRS port are quasi co-located with the first CSI-RS port and the second CSI-RS port in the CSI resource.

65. The computer-readable medium of any preceding clause, further including code causing the processor to receive a first set of synchronization signal block (SSBs) from the first cell of the network entity, and a second set of SSBs from the second cell of the network entity.

66. The computer-readable medium of any preceding clause, further including code causing the processor to select a first SSB having a highest signal quality corresponding to the first beam from the first set of SSBs and a second SSB having a highest signal quality corresponding to the second beam from the second set of SSBs based on an SSB measurement, where the first SSB and the second SSB are quasi co-located.

67. The computer-readable medium of any preceding clause, further including code causing the processor to transmit, to the network entity, a first SSB index including the first SSB of the first cell and a second SSB index including the second SSB of the second cell.

68. A computer-readable medium storing computer executable code, the code when executed by a processor cause the processor to:
transmit, on a first beam from a first cell to a user equipment (UE), a channel state information reference signal (CSI-RS) resource including a first CSI-RS port of the first cell;
transmit, on a second beam from a second cell to the UE, the CSI-RS resource including a second CSI-RS port of the second cell; and
receive, at the first cell or the second cell, a CSI report in response to transmitting the CSI-RS resource from the first cell and the second cell.

69. The computer-readable medium of clause 68, where the first beam is associated with the first CSI-RS port of the first cell and the second beam is associated with the second CSI-RS port of the second cell.

70. The computer-readable medium of any preceding clause, where the first CSI-RS port of the CSI-RS resource is quasi co-located with a first SSB or a third CSI-RS resource of the first cell, and the second CSI-RS port of the CSI-RS resource is quasi co-located with a second SSB or a fourth CSI-RS resource of the second cell.

71. The computer-readable medium of any preceding clause, where the CSI-RS resource is associated with multiple transmission configuration indicator (TCI) state identifiers of the first cell and the second cell, each of the multiple TCI state identifiers indicating a distinct quasi co-location source.

72. The computer-readable medium of any preceding clause, where the CSI report includes at least one of an amplitude or phase of the first beam and the second beam.

73. The computer-readable medium of any preceding clause, where the at least one processor is further configured to transmit a physical downlink shared channel (PDSCH) transmission on the first beam from the first cell and the second beam from the second cell in response to transmitting the CSI report, where the first beam is associated with a first demodulation reference signal (DMRS) port and the second beam is associated with a second DMRS port.

74. The computer-readable medium of any preceding clause, where the first DMRS port and the second DMRS port are quasi co-located with the first CSI-RS port and the second CSI-RS port in the CSI resource.

75. The computer-readable medium of any preceding clause, where the at least one processor is further configured to transmit, to the UE, a first set of synchronization signal block (SSBs) including a first SSB from the first cell, and a second set of SSBs including a second SSB from the second cell, where the first SSB and the second SSB are quasi co-located.

76. The computer-readable medium of any preceding clause, where the at least one processor is further configured to receive, from the UE, a first SSB index including the first SSB of the first cell and a second SSB index including the second SSB of the second cell.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communication at an apparatus of a user equipment (UE), comprising:
   receiving, on a first beam from a first cell of a network entity, a channel state information reference signal (CSI-RS) resource including a first CSI-RS port of the first cell;
   receiving, on a second beam from a second cell of the network entity, the CSI-RS resource including a second CSI-RS port of the second cell; and
   transmitting, to the first cell or the second cell of the network entity, a CSI report in response to receiving the CSI-RS resource from the first cell and the second cell.

2. The method of claim 1, wherein the first beam is associated with the first CSI-RS port of the first cell and the second beam is associated with the second CSI-RS port of the second cell.

3. The method of claim 2, wherein the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

4. The method of claim 1, wherein the CSI-RS resource is associated with multiple transmission configuration indicator (TCI) state identifiers of the first cell and the second cell, each of the multiple TCI state identifiers indicating a distinct quasi co-location source.

5. The method of claim 1, wherein the CSI report includes at least one of an amplitude or phase of the first beam and the second beam.

6. The method of claim 1, further comprising receiving a physical downlink shared channel (PDSCH) transmission on the first beam from the first cell and the second beam from the second cell in response to transmitting the CSI report, wherein the first beam is associated with a first demodulation reference signal (DMRS) port and the second beam is associated with a second DMRS port.

7. The method of claim 6, wherein the first DMRS port and the second DMRS port are quasi co-located with the first CSI-RS port and the second CSI-RS port in the CSI resource.

8. The method of claim 1, further comprising receiving a first set of synchronization signal block (SSBs) from the first cell of the network entity, and a second set of SSBs from the second cell of the network entity.

9. The method of claim 8, further comprising selecting a first SSB having a highest signal quality corresponding to the first beam from the first set of SSBs and a second SSB having a highest signal quality corresponding to the second beam from the second set of SSBs based on an SSB measurement, wherein the first SSB and the second SSB are quasi co-located.

10. The method of claim 9, further comprising transmitting, to the network entity, a first SSB index including the first SSB of the first cell and a second SSB index including the second SSB of the second cell.

11. A method of communication at an apparatus of a network entity, comprising:
transmitting, on a first beam from a first cell to a user equipment (UE), a channel state information reference signal (CSI-RS) resource including a first CSI-RS port of the first cell;
transmitting, on a second beam from a second cell to the UE, the CSI-RS resource including a second CSI-RS port of the second cell; and
receiving, at the first cell or the second cell, a CSI report in response to transmitting the CSI-RS resource from the first cell and the second cell.

12. The method of claim 11, wherein the first beam is associated with the first CSI-RS port of the first cell and the second beam is associated with the second CSI-RS port of the second cell.

13. The method of claim 12, wherein the first CSI-RS port of the CSI-RS resource is quasi co-located with a first SSB or a third CSI-RS resource of the first cell, and the second CSI-RS port of the CSI-RS resource is quasi co-located with a second SSB or a fourth CSI-RS resource of the second cell.

14. The method of claim 11, wherein the CSI-RS resource is associated with multiple transmission configuration indicator (TCI) state identifiers of the first cell and the second cell, each of the multiple TCI state identifiers indicating a distinct quasi co-location source.

15. The method of claim 11, wherein the CSI report includes at least one of an amplitude or phase of the first beam and the second beam.

16. The method of claim 11, further comprising transmitting a physical downlink shared channel (PDSCH) transmission on the first beam from the first cell and the second beam from the second cell in response to transmitting the CSI report, wherein the first beam is associated with a first demodulation reference signal (DMRS) port and the second beam is associated with a second DMRS port.

17. The method of claim 16, wherein the first DMRS port and the second DMRS port are quasi co-located with the first CSI-RS port and the second CSI-RS port in the CSI resource.

18. The method of claim 11, further comprising transmitting, to the UE, a first set of synchronization signal block (SSBs) including a first SSB from the first cell, and a second set of SSBs including a second SSB from the second cell, wherein the first SSB and the second SSB are quasi co-located.

19. The method of claim 18, further comprising receiving, from the UE, a first SSB index including the first SSB of the first cell and a second SSB index including the second SSB of the second cell.

20. An apparatus for wireless communication, comprising:
a transceiver;
a memory configured to store instructions; and
at least one processor communicatively coupled with the transceiver and the memory, wherein the at least one processor is configured to:
receive, on a first beam from a first cell of a network entity, a channel state information reference signal (CSI-RS) resource including a first CSI-RS port of the first cell;
receive, on a second beam from a second cell of the network entity, the CSI-RS resource including a second CSI-RS port of the second cell; and
transmit, to the first cell or the second cell of the network entity, a CSI report in response to receiving the CSI-RS resource from the first cell and the second cell.

21. The apparatus of claim 20, wherein the first beam is associated with the first CSI-RS port of the first cell and the second beam is associated with the second CSI-RS port of the second cell.

22. The apparatus of claim 21, wherein the first CSI-RS port of the CSI-RS resource is quasi co-located with a first synchronization signal block (SSB) or a third CSI-RS resource of the first cell, and the second CSI-RS port of the CSI-RS resource is quasi co-located with a second SSB or a fourth CSI-RS resource of the second cell.

23. The apparatus of claim 20, wherein the CSI-RS resource is associated with multiple transmission configuration indicator (TCI) state identifiers of the first cell and the second cell, each of the multiple TCI state identifiers indicating a distinct quasi co-location source.

24. The apparatus of claim 20, wherein the CSI report includes at least one of an amplitude or phase of the first beam and the second beam.

25. The apparatus of claim 20, wherein the at least one processor is further configured to receive a physical downlink shared channel (PDSCH) transmission on the first beam from the first cell and the second beam from the second cell in response to transmitting the CSI report, wherein the first beam is associated with a first demodulation reference signal (DMRS) port and the second beam is associated with a second DMRS port.

26. The apparatus of claim 25, wherein the first DMRS port and the second DMRS port are quasi co-located with the first CSI-RS port and the second CSI-RS port in the CSI resource.

27. The apparatus of claim 20, wherein the at least one processor is further configured to receive a first set of synchronization signal block (SSBs) from the first cell of the network entity, and a second set of SSBs from the second cell of the network entity.

28. The apparatus of claim 27, wherein the at least one processor is further configured to select a first SSB having a highest signal quality corresponding to the first beam from the first set of SSBs and a second SSB having a highest signal quality corresponding to the second beam from the second set of SSBs based on an SSB measurement, wherein the first SSB and the second SSB are quasi co-located.

29. An apparatus for wireless communication, comprising:
a transceiver;
a memory configured to store instructions; and
at least one processor communicatively coupled with the transceiver and the memory, wherein the at least one processor is configured to:

transmit, on a first beam from a first cell to a user equipment (UE), a channel state information reference signal (CSI-RS) resource including a first CSI-RS port of the first cell;

transmit, on a second beam from a second cell to the UE, the CSI-RS resource including a second CSI-RS port of the second cell; and receive, at the first cell or the second cell, a CSI report in response to transmitting the CSI-RS resource from the first cell and the second cell.

30. The apparatus of claim 29, wherein the first beam is associated with the first CSI-RS port of the first cell and the second beam is associated with the second CSI-RS port of the second cell.

* * * * *